(12) United States Patent
Vanhalle et al.

(10) Patent No.: US 8,872,034 B2
(45) Date of Patent: Oct. 28, 2014

(54) FLAME RETARDANT THERMOPLASTIC COMPOSITION

(75) Inventors: Anja Vanhalle, Everberg (BE); Hugo Verbeke, Leuven (BE); Sandra Marie Louise Meynen, Tienen (BE)

(73) Assignee: Huntsman International LLC, The Woodlands, TX (US)

( * ) Notice: Subject to any disclaimer, the term of this patent is extended or adjusted under 35 U.S.C. 154(b) by 405 days.

(21) Appl. No.: 13/375,841

(22) PCT Filed: May 19, 2010

(86) PCT No.: PCT/EP2010/056842
§ 371 (c)(1),
(2), (4) Date: Dec. 2, 2011

(87) PCT Pub. No.: WO2010/142519
PCT Pub. Date: Dec. 16, 2010

(65) Prior Publication Data
US 2012/0073858 A1    Mar. 29, 2012

(30) Foreign Application Priority Data

Jun. 8, 2009  (EP) .................... 09162174

(51) Int. Cl.
| H01B 7/295 | (2006.01) |
| C08L 75/04 | (2006.01) |
| C08K 5/00 | (2006.01) |
| C08K 5/5419 | (2006.01) |

(52) U.S. Cl.
CPC ............... H01B 7/295 (2013.01); C08L 75/04 (2013.01); *C08K 5/0066* (2013.01); *C08K 5/5419* (2013.01)

USPC ....................................... 174/121 A

(58) Field of Classification Search
CPC ....................................... H01B 7/295
USPC ....................................... 174/121 A
See application file for complete search history.

(56) References Cited

U.S. PATENT DOCUMENTS

| 2002/0045695 A1 | 4/2002 | Hatanaka et al. |
| 2002/0072554 A1 | 6/2002 | Mehl |
| 2005/0165122 A1* | 7/2005 | Braun et al. .................... 521/50 |
| 2006/0116435 A1* | 6/2006 | Housel ......................... 521/174 |
| 2007/0179225 A1 | 8/2007 | Shiping |

FOREIGN PATENT DOCUMENTS

| JP | 2006/008940 | 1/2006 |
| WO | 2005/023924 | 3/2005 |

OTHER PUBLICATIONS

International Search Report and Written Opinion regarding corresponding application No. PCT/EP2010/056842, dated Aug. 13, 2010.

* cited by examiner

*Primary Examiner* — Chau N Nguyen
(74) *Attorney, Agent, or Firm* — Robert A. Diaz

(57) ABSTRACT

Flame retardant thermoplastic composition comprising at least one thermoplastic polymer, preferably a thermoplastic polyurethane polymer, at least one conventional flame retardant and optionally at least one mineral filler together with modified polysiloxane in an amount of less than 1% by weight based on the total composition, preferably between 0.1 and 0.9% and most preferably between 0.25 and 0.75% by weight. The thermoplastic compositions are useful in applications where low flame properties are desirable, such as wire and cable applications.

16 Claims, No Drawings

FLAME RETARDANT THERMOPLASTIC COMPOSITION

This application is the National Phase of International Application PCT/EP2010/056842 filed May 19, 2010 which designated the U.S. and which claims priority to Foreign Application No. 09162174.8 filed Jun. 8, 2009. The noted applications are incorporated herein by reference.

This invention relates to flame retardant thermoplastic compositions, preferably thermoplastic polyurethane (TPU) compositions useful for applications where high flame retardant performance is desirable, such as wire and cable applications, blown film, molding applications, and the like.

Thermoplastically processable polyurethane—which will be referred to as TPU below—is a material that has proven successful as a sheath material in the cable industry due to its excellent properties. The material is highly abrasion resistant, has high thermal stability, and can be made flame-resistant to self-extinguishing by adding certain materials. Cable sheaths made of polyurethane exhibit resistance to cutting, initial tearing, and tear propagation. In addition, polyurethane is or can be formulated to be resistant to ozone, microbes, oil, and high-energy radiation. Cables equipped with a polyurethane sheath are extremely flexible and can withstand high numbers of bending cycles over tight radii.

However TPU has a mostly undesirable characteristic in that it forms a relatively thin melt at elevated temperatures. In case of fire, this has the effect that the liquid material drips off and the cable core is thus exposed. At extremely high temperatures, the materials added to improve flame-resistance are frequently inadequate, and burning or hot material drips and, under some circumstances, ignites other material, thereby causing a rapid expansion of fire.

DE 3444500 discloses a hardly flammable cable in which at least the outer layer of the cable sheath consists of fully or partially irradiation crosslinked polyurethane. The crosslinked polyurethane forms a flame resistant, closed envelop, which does not drip under the action of flames and thus does not subsequently permit the underlying layers in the cable construction to melt in the flame.

The drawback, however, is that irradiation crosslinking is a separate process step, and irradiation crosslinking systems are subject to particularly high requirements, which drives up the production costs. A further drawback is that crosslinked polyurethane is not recyclable and is expensive to dispose of.

US 2002/0072554 describes a flame-resistant polymer mixture, particularly for the sheath of cables and conductors, comprising polyurethane, fillers and additives and 1 to 10, preferably 3 to 7 parts of polysiloxane, which contains functional methacrylate and/or epoxy groups, per 100 parts by weight of the flame-resistant polyurethane. This polymer mixture can be thermoplastically processed and does not drip in case of fire.

However adding polysiloxane in the amounts described in US 2002/0072554 has a negative effect on the fire retardancy properties of the polymer mixture.

It is an object of the present invention to provide a flame-resistant polymer mixture, which can be thermoplastically processed, does not drip in case of fire and has excellent flame retardancy.

It is another object of the present invention to make a TPU composition which can be used as a cable insulator or as a jacket in a wire and cable construction and passes the fire test UL VW-1 (UL 1581).

These and other objects are accomplished by providing a thermoplastic composition comprising at least one thermoplastic polymer, preferably thermoplastic polyurethane (TPU) polymer and at least one fire retardant together with modified polysiloxane in an amount of less than 1% by weight based on the total composition, preferably 0.1 to 0.9% by weight more preferably 0.25 to 0.75% by weight, and most preferably 0.3 to 0.75% or even 0.5 to 0.75% by weight.

The polysiloxane used in the present invention is modified by the introduction, preferably at the end of the backbone, of functional groups such as vinyl, methacrylate and/or epoxy. Preferably the polysiloxane, preferably polydimethylsiloxane (PDMS) is modified with vinyl groups which are preferably present in a ratio of 1 vinyl group per 250 to 10000 siloxane groups.

Typically the molecular weight of the polysiloxane backbone lies between 200000 and 600000, with a preference for the high end of the molecular weight range in order to obtain further benefits such as less or no migration, less screw slippage, improved release, lower coefficient of friction, fewer paint and printing problems and a broader range of performance capabilities.

The modified polysiloxane preferably has a viscosity higher than 30000 cPs; preferably it is even solid.

Examples of commercially available suitable modified polysiloxanes for use in the present invention include from Dow Corning: Sylgard 184, Silastic T-2 and DC 3-4939; from Gelest Inc.: DMS-V31S15, DMS-V46, DMS-V35, DMS-V35R, DMS-V33, DMS-V52, DMS-V31, DMS-V25R, DMS-V41 and DMS-V42; from Wacker: Genioplast Pellets S, Genioplast S-L5.4 and PA 445503 VP; from ABCR GmbH: AB129589, AB109359, AB109362, AB109360, AB128873, AB109361, AB109358, AB146372, AB127688, AB252404, AB127688, AB116650 and AB109409; from Andisil: Nanocone VN, Nanocone XP, Andisil VDM 500 polymer, Andisil VS 6, VS 1000, VS 2000, VS 4000, VS 5000, VS 10000, VS 20000, VS 65000, VS 80000, VS 100000, VS 165000, Andiform C100, Andiform C106, Andiform C300, Andiform C1000 and Andiform C1300; from Silicones Inc.: XP-540A and XP-540B.

A minimum amount of this modified polysiloxane is required to avoid dripping but using an amount higher than 1 wt % makes the flame retardancy deteriorate.

In the case of fire, the thermoplastic composition according to the invention forms a crusty layer, which prevents molten, burning material from dripping. This crust has heat-insulating properties, which prevent accelerated heating of the material under the action of the flames.

The thermoplastic composition further contains conventional flame retardants known in the art such as melamine, melamine phosphate, melamine polyphosphate, melamine cyanurate, melamine borate, other melamine derivatives, organic phosphates such as triaryl phosphates, polyhydric alcohols such as pentaerythritol and dipentaerythritol, organic phosphonates, salts of phosphinic acids ((di)phosphinates) and mixtures thereof. Some mixtures will provide synergistic effect as described in the prior art.

Mineral fillers can be used as fire retardants as well; generally a higher amount of fire retardant is needed then. Examples of such mineral fire retardants include hydroxides such as magnesium hydroxide, calcium hydroxide, aluminum hydroxide and zinc hydroxide.

The total amount of flame retardant used in the thermoplastic composition is generally from 2 to 70 wt %, preferably from 10 to 60 wt %.

According to one embodiment of the invention a mixture of flame retardants is used, said mixture containing phosphinates (e.g. aluminum phosphinate, calcium phosphinate, zinc phosphinate), nitrogen-containing synergists (e.g. melamine cyanurate, benzoguanamine, tris(hydroxyethyl)isocyanurate, allantoin, glycoluril, urea cyanurate, dicyandiamide, guanidine) and phosphorous-nitrogen compounds (e.g. melamine polyphosphate, dimelamine phosphate, dimelamine pyrophosphate, melamine phosphate, melamine pyrophosphate, melam polyphosphate, melon polyphosphate, melem polyphosphate), as described in EP 1568731 incorporated herein by reference. A particularly preferred mixture contains 15 to 80 wt % of a (di)phosphinic salt and 10 to 75 wt %, preferably 10 to 40 wt % of a nitrogen-containing synergist and 10 to 75 wt %, preferably 10 to 40 wt % of a phosphorous/nitrogen flame retardant.

In a preferred embodiment the thermoplastic composition also comprises non-fire-retardant mineral fillers such as certain oxides, carbonates, silicates, borates, stannates, mixed oxide hydroxides, oxide hydroxide carbonates, hydroxide silicates, or hydroxide borates, or a mixture of these substances. By way of example, use may be made of magnesium oxide, calcium oxide, aluminum oxide, manganese oxide, tin oxide, boehmite, dihydrotalcite, hydrocalumite, or calcium carbonate. Preferred compounds are silicates and hydroxide silicates. These fillers are usually added in amounts of between 1 to 20 wt % based on the thermoplastic composition, preferably between 1 and 10 wt %.

Adding such a mineral filler in the amounts described above provides more efficient anti-dripping effect.

The thermoplastic polymer used in this invention can be any conventional thermoplastic polymer that is known in the art such as polylactones, polycarbonates, polysulphones, polyethers, polyketones, polyamides, polyesters, poly(arylene oxide)s, poly(arylene sulphide)s, polyetherimides, vinyl (co)polymers, acrylic polymers, polyolefins and polyurethanes.

Preferably however a thermoplastic polyurethane (TPU) is used. The TPU polymer is generally prepared by reacting a polyisocyanate with an intermediate such as a hydroxyl terminated polyester, a hydroxyl terminated polyether, a hydroxyl terminated polycarbonate or mixture thereof, with one or more chain extenders, all of which are well known to those skilled in the art.

The hydroxyl terminated polyester intermediate is generally a linear polyester having a number average molecular weight (Mn) of from about 500 to about 10000, desirably from about 700 to about 5000, and preferably from about 700 to about 4000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e. the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. 1,4-Butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethyl glycol) (PTMG) comprising water reacted with tetrahydrofuran (THF). Polytetramethylene ether glycol (PTMEG) is the preferred polyether intermediate. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. The various polyether intermediates generally have a number average molecular weight (Mn), as determined by assay of the terminal functional groups which is an average molecular weight, of from about 500 to about 10000, desirably from about 500 to about 5000, and preferably from about 700 to about 3000.

Hydroxyl terminated polycarbonate intermediates can be prepared by reacting a glycol with a carbonate.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6,2,2,4-trimethylhexanedion-1,6, decanediol-1,10, hydrogenated dilinoleylglycol, hydrogenated diolelylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product.

Suitable carbonates are selected from alkylene carbonates composed of a 5 to 7 membered ring having the following general formula:

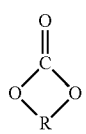

where R is a saturated divalent radical containing 2 to 6 linear carbon atoms. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate and 2,4-pentylene carbonate.

Also suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Preferred examples of diarylcarbonates, which can contain 6 to 20 carbon atoms in each aryl group, are diphenylcarbonate, ditolylcarbonate and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm Hg in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10000 but in a preferred embodiment, it will be in the range of 500 to 2500.

Suitable extender glycols (i.e., chain extenders) are lower aliphatic or short chain glycols having from about 2 to about 10 carbon atoms and include, for instance, ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl) ether, neopentylglycol, and the like, with 1,4-butanediol and hydroquinone di(hydroxyethyl)ether being preferred.

The desired TPU polymer used in the TPU composition of this invention is generally made from the abovementioned intermediates such as a hydroxyl terminated polyester, polyether, or polycarbonate, preferably polyether, which is further reacted with a polyisocyanate, preferably a diisocyanate, along with extender glycol desirably in a so-called one-shot process or simultaneous co-reaction of polyester, polycarbonate or polyether intermediate, diisocyanate, and extender glycol to produce a high molecular weight linear TPU polymer. The preparation of the macroglycol is generally well known in the art and any suitable method may be used. The weight average (Mw) of the TPU polymer is generally about 80000 to 800000, and preferably from about 90000 to about 450000 Daltons. The equivalent weight amount of diisocyanate to the total equivalent weight amount of hydroxyl containing components, that is the hydroxyl terminated polyester, polyether, or polycarbonate, and chain extender glycol, is typically from about 0.95 to about 1.10, desirably from about 0.96 to about 1.02, and preferably from about 0.97 to about 1.005.

Suitable diisocyanates include aromatic diisocyanates such as 4,4'-methylenebis-(phenyl isocyanate) (MDI), m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI), as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4-methylenebis(phenyl isocyanate), i.e. MDI.

In the one-shot polymerisation process which generally occurs in situ, a simultaneous reaction occurs between three components, that is, the one or more intermediates, the one or more polyisocyanates, and the one or more chain extenders, with the reaction generally being initiated at temperatures of from about 100° C. to about 120° C. Inasmuch as the reaction is exothermic, the reaction temperature generally increases to about 220° C.-250° C. In one exemplary embodiment, the TPU polymer may be pelletized following the reaction. The modified polysiloxane, flame retardant components and optionally fillers may be incorporated with the TPU polymer pellets to form the flame retardant composition of the present invention in a subsequent process.

Other additives apart from the modified polysiloxane, flame retardants and fillers may be used in the thermoplastic compositions of this invention. Additives such as stabilisers, lubricants, colorants, antioxidants, antiozonates, light stabilisers, UV stabilisers and the like may be used in amounts of from 0 to 5 wt % of the thermoplastic composition, preferably from 0 to 2 wt %.

The thermoplastic polymer, modified polysiloxane, flame retardant and other additives may be compounded together by any means known to those skilled in the art. If a pelletized TPU polymer is used, the polymer may be melted at a temperature of about 150° C. to 215° C., preferably from about 160 to 190° C., and more preferably from about 170 to 180° C. The particular temperature used will depend on the particular TPU polymer used, as is well understood by those skilled in the art. The TPU polymer and the flame retardant components are blended to form an intimate physical mixture. Blending can occur in any commonly used mixing device able to provide shear mixing, but a twin screw extruder having multiple heat zones with multiple feeding ports is preferably used for the blending and melting process i.e. compounding.

The TPU polymer, modified polysiloxane, flame retardants and other additives may be pre-blended before adding to the compounding extruder or they may be added or metered into the compounding extruder in different streams and in different zones of the extruder.

In an alternate embodiment, the TPU polymer is not pelletized prior to the addition of the modified polysiloxane and other additives. Rather, the process for forming the flame retardant thermoplastic polyurethane composition of the present invention is a continuous in situ process. The ingredients to form the thermoplastic polyurethane polymer are added to a reaction vessel, such as a twin screw extruder as set forth above. During or after formation of the thermoplastic polyurethane polymer, the modified polysiloxane, flame retardants and optionally other additives may be added or metered into the extruder in different streams and/or in different zones of the extruder in order to form the thermoplastic polyurethane composition.

The resultant TPU composition may exit the extruder die in a molten state and be pelletized and stored for further use in making finished articles. The finished articles may comprise injection-molded parts. Other finished articles may comprise extruded profiles and sheets.

The thermoplastic composition of the present invention may be utilized in any application where high flame retardant performance is desired. In particular it can be utilised as conductor insulator or as a cable jacket as set forth in further detail below.

The disclosed TPU compositions, because of their flame retardant properties, abrasion resistance and good tensile strength, are particularly suited for use as jacketing for electrical conductors in wire and cable construction applications, such as jacketing for armored cable, industrial robotic equipment, non-metallic sheath cable, deep well pump cables and other multiple conductor assemblies and consumer goods.

A typical wire and cable construction will have at least one and typically will have multiple electrical conductors, usually from 2 to 8 conductors, such as copper wires. Each conductor will typically be coated, normally by extrusion, with a thin layer of polymeric insulation compound which can be polyvinyl chloride, polyethylene, cross-linked polyethylene, fluorocarbon polymers, or the TPU composition of the present invention. The multiple insulated conductors may be wrapped with metal, a fiberglass or other non-flammable textile. The multiple conductors can then be encased in a jacket material (i.e., the TPU composition of this invention) to protect the electrical conductors. It is necessary for this jacket material to be flame resistant in case a fire occurs.

The types of wire and cable constructions that are most suitable for using a jacket made from the TPU compositions of the present invention are detailed in the UL-1581 standard. The UL-1581 standard contains specific details of the conductors, of the insulation, of the jackets and other coverings, and of the methods of sample preparation, of specimen selection and conditioning, and of measurement and calculation that are required in standards for Thermoset-Insulated Wires and Cable (UL-44), Thermoplastic-Insulated Wires and Cables (UL-83), Flexible Cord and Fixture Wire (UL-62) and Service-Entrance Cables (UL-854) and UL 758.

The TPU composition of the present invention not only passes all the fire retardancy tests mentioned above for wire and cable constructions but also all conventional tests for other flame-retardant applications such as UL94.

The fire performance of a wire and cable construction can be influenced by many factors, with the jacket being one factor. The flammability of the insulation material can also affect the fire performance of the wire and cable construction, as well as other inner components, such as paper wrappings, fillers, and the like.

Exemplary embodiments of wire and cable constructions are made by extruding the TPU composition onto a bundle of insulated conductors to form a jacket around the insulated conductors. The thickness of the jacket depends on the requirements of the desired end use application. Typical thickness of the jacket is from about 0.25 mm to 5 mm and more typical from about 0.5 mm to about 1.5 mm.

The TPU compositions may be shaped by extrusion to form the jacket. Usually, the TPU composition is in the form of pellets for easy feeding into the extruder. This method is the most common since the TPU composition is not normally made by the same party that makes the wire and cable construction. However, in accordance with an exemplary embodiment of the invention, the wire and cable jacket could be extruded directly from the compounding extruder without going through the separate step of pelletizing the TPU composition. This one-step compounding/extrusion process would eliminate one heat history step from the TPU composition.

The invention is illustrated but not limited by the following examples.

In these examples the following ingredients are used:
TPU: Irogran A 85P, commercially available from Huntsman
FR: a flame retardant package
PDMS: a vinyl modified PDMS
Filler: a non-retardant mineral filler, magnesium silicate hydroxide

EXAMPLE

A commercially available TPU (IROGRAN A 85P) was intimately mixed using a compounder with flame retardants, filler and modified PDMS, the type and amount of which is given in Table 1 below, molten and processed into a granulate. The granulates were placed into an extruder, and with this mixture a sheath having a wall thickness of 1 mm was extruded onto a multistranded cable core of 0.78 mm diameter.

Ten cables of the same composition and design thus produced were subjected to the UL VW-1 Vertical-Wire Flame Test (UL 1581). This is a small-scale test conducted on a single 24-inch length of wire. The flame source is a Tirrill burner (similar to a Bunsen burner) with a heat output of approximately 3000 BTU/hour. The flame is applied for 15 seconds and is then reapplied 4 more times. The period between applications is 15 seconds where the specimen ceases to burn within 15 seconds or the duration of the specimen flaming where this persists longer than 15 seconds. If the sample burns longer than 60 seconds after any application, or if the indicator flag or cotton batting is ignited during the test or if the indicator flag is ignited or scorched more than 25%, the cable fails the test.

The results are given in Table 1.

These results show that only when amounts of modified PDMS within the claimed range together with fire retardant are used the samples pass the dripping test (samples 7 to 9). By further adding mineral filler (samples 17 to 19) also the flag burning test is passed.

TABLE 1

| Sample No. | TPU | FR | PDMS | Filler | After burn (sec) | Dripping (% pass) | Flag burning (% pass) |
|---|---|---|---|---|---|---|---|
| 1 (Comp) | 100 | 0 | 0 | 0 | 65 | 0 | 0 |
| 2 (Comp) | 99.5 | 0 | 0.5 | 0 | 67 | 0 | 0 |
| 3 (Comp) | 99 | 0 | 1 | 0 | >80 | 0 | 0 |
| 4 (Comp) | 95 | 0 | 5 | 0 | >80 | 0 | 0 |
| 5 (Comp) | 90 | 0 | 10 | 0 | >80 | 0 | 0 |
| 6 (Comp) | 70 | 30 | 0 | 0 | 10 | 50 | 100 |
| 7 | 69.75 | 30 | 0.25 | 0 | 17 | 75 | 100 |
| 8 | 69.5 | 30 | 0.5 | 0 | 48 | 100 | 100 |
| 9 | 69.25 | 30 | 0.75 | 0 | 59 | 100 | 100 |
| 10 Comp | 90 | 0 | 0 | 10 | 42 | 0 | 0 |
| 11 Comp | 89.5 | 0 | 0.5 | 10 | 65 | 0 | 0 |
| 12 Comp | 89 | 0 | 1 | 10 | 57 | 0 | 0 |
| 13 Comp | 80 | 0 | 0 | 20 | 58 | 0 | 0 |
| 14 Comp | 79.5 | 0 | 0.5 | 20 | 59 | 0 | 0 |
| 15 Comp | 79 | 0 | 1 | 20 | 105 | 0 | 0 |
| 16 Comp | 64 | 30 | 0 | 6 | 15 | 75 | 100 |
| 17 | 63.75 | 30 | 0.25 | 6 | 10 | 100 | 100 |
| 18 | 63.5 | 30 | 0.5 | 6 | 6 | 100 | 100 |
| 19 | 63.25 | 30 | 0.75 | 6 | 7 | 100 | 100 |
| 20 | 63.1 | 30 | 0.9 | 6 | 14 | 100 | 80 |
| 21 (Comp) | 63 | 30 | 1 | 6 | 20 | 100 | 70 |
| 22 (Comp) | 59 | 30 | 5 | 6 | 27 | 100 | 50 |

The invention claimed is:

1. A flame retardant thermoplastic composition comprising:
   (a) at least one thermoplastic polyurethane polymer;
   (b) at least one flame retardant; and
   (c) a vinyl modified polysiloxane having vinyl groups present in a ratio of 1 vinyl group per 250 to 10000 siloxane groups,
   characterised in that the vinyl modified polysiloxane is present in an amount of less than 1% by weight based on the total composition.

2. A wire and cable construction comprising at least one metal conductor insulated with a thermoplastic composition as defined in claim 1.

3. The wire and cable construction according to claim 2, further comprising a flame retarded jacket covering said insulated metal conductor.

4. A wire and cable construction comprising at least one metal conductor insulated with a thermoplastic composition as defined in claim 1, wherein the thermoplastic composition is covered with a flame retarded jacket, wherein the flame retarded jacket is a thermoplastic composition as defined in claim 1.

5. The flame retardant thermoplastic composition according to claim 1, wherein the vinyl modified polysiloxane is present in an amount of 0.1 to 0.9% based on the total composition.

6. The flame retardant thermoplastic composition according to claim 1, wherein the vinyl modified polysiloxane is present in an amount of 0.25 to 0.75% by weight based on the total composition.

7. The flame retardant thermoplastic composition according to claim 1, wherein the vinyl modified polysiloxane is formed by the introduction of vinyl groups to a polysiloxane.

8. The flame retardant thermoplastic composition according to claim 1, wherein the vinyl modified polysiloxane is a vinyl modified polydimethylsiloxane.

9. The flame retardant thermoplastic composition according to claim 1, wherein the flame retardant is present in an amount of 2 to 70% by weight based on the total composition.

10. The flame retardant thermoplastic composition according to claim 1, wherein the flame retardant is present in an amount of 10 to 60% by weight based on the total composition.

11. The flame retardant thermoplastic composition according to claim 1, wherein at least one non-fire-retardant mineral filler is also present.

12. The flame retardant thermoplastic composition according to claim 11, wherein said mineral filler is present in an amount of 1 to 20% by weight based on the total composition.

13. The flame retardant thermoplastic composition according to claim 11, wherein said mineral filler is present in an amount of 1 to 10% by weight based on the total composition.

14. The flame retardant thermoplastic composition according to claim 11, wherein said mineral filler is calcium carbonate or (hydroxide) silicate.

15. The flame retardant thermoplastic composition according to claim 1, wherein the thermoplastic polyurethane polymer is prepared by reacting a polyisocyanate with a hydroxyl terminated polyester or a hydroxyl terminated polyether or a hydroxyl terminated polycarbonate or a mixture thereof in the presence of a chain extender.

16. A wire and cable construction comprising:
   (a) at least one metal conductor wherein said conductor is insulated with a non-conducting polymeric material;
   (b) a flame retarded jacket covering said insulated metal conductor, characterised in that said jacket is a thermoplastic composition as defined in claim 1.

* * * * *